Application filed June 30, 1913. Serial No. 776,541.

UNITED STATES PATENT OFFICE.

MICHAEL KARDOS, OF CHARLOTTENBURG, GERMANY, ASSIGNOR TO BADISCHE ANILIN & SODA FABRIK, OF LUDWIGSHAFEN-ON-THE-RHINE, GERMANY, A CORPORATION.

GREEN VAT DYES AND PROCESS OF MAKING THEM.

1,216,134. Specification of Letters Patent. Patented Feb. 13, 1917.

No Drawing.

*To all whom it may concern:*

Be it known that I, MICHAEL KARDOS, citizen of Hungary, residing at Charlottenburg, Germany, have invented new and useful Improvements in Green Vat Dyes and Processes of Making Them, of which the following is a specification.

I have discovered new green vat coloring matters of the anthracene series which are characterized by being soluble in alkaline hydrosulfite solution giving red solutions. I can obtain my new coloring matters by subjecting to the action of a molten caustic alkali a product obtainable by acting on aceanthrene quinone with hydroxylamin and which I regard as an oxim and hereinafter refer to under this name. Instead of employing aceanthrene quinone, I can make use of a halogen derivative thereof and for the purposes of this invention I regard such halogen derivatives as being equivalent to aceanthrene quinone. Further, the hydroxylamin can be replaced by an equivalent thereof, such as a body which gives rise to hydroxylamin. Instead of subjecting the compounds hereinbefore termed oxims to the action of an alkaline melt, I can first treat them with acids, for instance with glacial acetic acid, in the presence of hydrochloric acid and acetic anhydrid, or with concentrated sulfuric acid, whereupon compounds are obtained which are probably imids of anthracene-1.9-dicarboxylic acid or halogen derivatives thereof. The said imids, on treatment with molten caustic alkali, also give rise to the new green vat coloring matters of this invention.

Aceanthrene quinone is described by Liebermann in *Berichte* vol. 44, page 204, and probably has a constitution corresponding to the formula:—

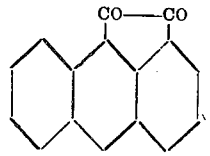

I regard aceanthrene quinone oxim as possessing the constitution corresponding to the formula:—

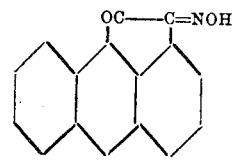

and I, further, regard anthracene-1.9-dicarboxylic acid imid as possessing a constitution corresponding to the formula:—

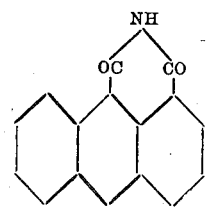

The following examples will serve to illustrate further the nature of my invention and how it can be carried into practical effect, but the invention is not confined to these examples. The parts are by weight.

*Example 1.*

Introduce, while stirring, 2 parts of the product obtainable from hydroxylamin and aceanthrene quinone, which is hereinbefore referred to as an oxim, into 12 parts of molten commercial caustic potash, while maintaining a temperature of from 210° to 230° C. Continue heating the melt for about 10 minutes at this temperature and then pour it into water, while stirring. Add 25 parts of a 30% solution of acetic acid and pass air through the solution until the original red-violet color has disappeared and no more separation takes place. Then filter, wash the product until the filtrate is neutral and dry the residue which is soluble in alkaline hydrosulfite solution yielding a cherry red vat which colors cotton red-violet shades, which shades, on exposure to air, become beautiful full green.

A similar procedure can be followed in order to obtain vat coloring matters from the condensation products of halogenated aceanthrene quinone and hydroxylamin.

*Example 2.*

Maintain 1 part of the body referred to hereinbefore as anthracene-1.9-dicarboxylic acid imid with 5 parts of caustic alkali and a small quantity of water at from 200° to 230° C. until the formation of the coloring matter is complete. Allow the melt to cool, dissolve it in water, neutralize a part of the alkali and pass air through the solution, whereupon a green coloring matter is precipitated in flakes. If desired, the oxidation can be carried out by other means. The coloring matter is soluble in alkaline hydrosulfite solution yielding a cherry red vat which colors cotton red-violet shades which shades, on exposure to the air, become a beautiful full green.

A similar procedure can be followed when employing a corresponding compound obtained from a halogenated aceanthrene quinone.

Now what I claim is:—

1. The new vat coloring matters of the anthracene series obtainable by melting anthracene-1.9-dicarboxylic acid imids with caustic alkali, which new coloring matters are soluble in alkaline hydrosulfite solution giving red solutions and which dye cotton beautiful full green shades of excellent fastness.

2. The new vat coloring matter of the anthracene series obtainable by melting anthracene-1.9-dicarboxylic acid imids with caustic alkali, which new coloring matter is soluble in alkaline hydrosulfite solution yielding a cherry red vat which colors cotton red-violet shades, which shades, on exposure to air, become a beautiful full green.

3. The process of producing vat coloring matters of the anthracene series by first treating an aceanthrene quinone oxim body with an acid and then subjecting the product to the action of an alkaline melt.

4. In the process of producing vat coloring matters of the anthracene series, the step which consists in subjecting anthracene-1.9-dicarboxylic acid imid to the action of a caustic alkaline melt.

In testimony whereof I have hereunto set my hand in the presence of two subscribing witnesses.

MICHAEL KARDOS.

Witnesses:
OTTO GLAUF,
ADALBERT MOSKOVITS.